United States Patent [19]
Sarghie et al.

[11] Patent Number: 5,263,691
[45] Date of Patent: Nov. 23, 1993

[54] HELICOPTER LOAD VIBRATION DAMPER

[75] Inventors: Hans Sarghie; Kurt Gysler, both of Richmond; William R. Adams, New Westminster, all of Canada

[73] Assignee: H-S Tool & Parts Inc., Richmond, Canada

[21] Appl. No.: 963,432

[22] Filed: Oct. 19, 1992

[51] Int. Cl.$^5$ .................................. F16F 9/14
[52] U.S. Cl. ..................... 267/64.15; 248/565; 248/576; 248/631; 267/64.26; 267/64.28; 280/708
[58] Field of Search .......... 267/64.15, 64.25, 64.26, 267/64.28; 280/708; 248/565, 610, 631, 576

[56] References Cited

U.S. PATENT DOCUMENTS 2,956,796 10/1960 Devillers ........................ 267/64.15
3,547,425 12/1970 Wachenheim ............... 267/64.26 X

FOREIGN PATENT DOCUMENTS 1455180 3/1969 Fed. Rep. of Germany ... 267/64.15

Primary Examiner—George E. A. Halvosa
Attorney, Agent, or Firm—Barrigar & Oyen

[57] ABSTRACT

A helicopter load vibration damper having an outer cylinder with closed upper and lower ends. A piston is slidably mounted within the cylinder to define a chamber between the piston and the cylinder's lower end. The chamber is pressurized with an inert gas such as nitrogen, with the gas pressure being adjustable to suit the load which is to be transported. A rod is fixed to one side of the piston, extends through the chamber and protrudes through the lower end of the cylinder for attachment to the load. A hydraulic shock absorber is connected between the opposite side of the piston and the upper end of the cylinder. An anti-rotation mechanism prevents the shock absorber from rotating relative to the rod, around the vibration damper's longitudinal axis. The anti-rotation mechanism incorporates a tube which encircles the shock absorber, within the outer cylinder. A pin used to couple the shock absorber to the piston is also coupled to the tube. The tube is fastened to the outer cylinder to hold it in place, relative to the outer cylinder.

4 Claims, 2 Drawing Sheets

HELICOPTER LOAD VIBRATION DAMPER

Field of the Invention

This application pertains to apparatus for reducing vibrations imposed on a helicopter when a load suspended from the helicopter's cargo hook is initially lifted, released, slips, or comes in contact with an immovable object.

BACKGROUND OF THE INVENTION

Helicopters are commonly used to transport heavy objects by suspending such objects from a cargo hook attached to the helicopter by a cargo line. For example, loads weighing 10,000 pounds or more may be lifted and transported in helicopter logging operations. Such loads impose large vibration forces on the helicopter airframe and on the helicopter's operating personnel. In particular, large vibration forces are transmitted from the load through the cargo line to the helicopter airframe when the load is initially lifted and when it is released. Similar large vibration forces are imposed on the helicopter airframe if the load slips during transport, or if the load inadvertently contacts the ground or some other immovable object during transport.

The present invention provides a vibration damper which may be connected in the cargo line between the load and the helicopter airframe to significantly reduce the vibration forces transmitted to the helicopter airframe.

SUMMARY OF THE INVENTION

In accordance with the preferred embodiment, the invention provides a helicopter load vibration damper having an outer cylinder with closed upper and lower ends. A piston is slidably mounted within the cylinder to define a chamber between the piston and the lower end of the cylinder. The chamber is pressurized with an inert gas such as nitrogen, with the gas pressure being adjustable to suit the load which is to be transported. A rod is fixed to one side of the piston, extends through the chamber and protrudes through the lower end of the cylinder for attachment to the load. A power cylinder such as a hydraulic shock absorber is connected between the opposite side of the piston and the upper end of the cylinder.

An anti-rotation mechanism is provided to prevent the shock absorber from rotating relative to the rod, about the vibration damper's longitudinal axis. The anti-rotation mechanism takes the form of a tube encircling the shock absorber, within the outer cylinder. The tube is held in place by an anti-rotation roller. A pin which couples the shock absorber to the piston is also coupled to the tube. The tube is fastened to the outer cylinder to hold it in place, relative to the outer cylinder.

DETAILED DESCRIPTION OF THE PREFERRED EMBODIMENT

Figure 1:
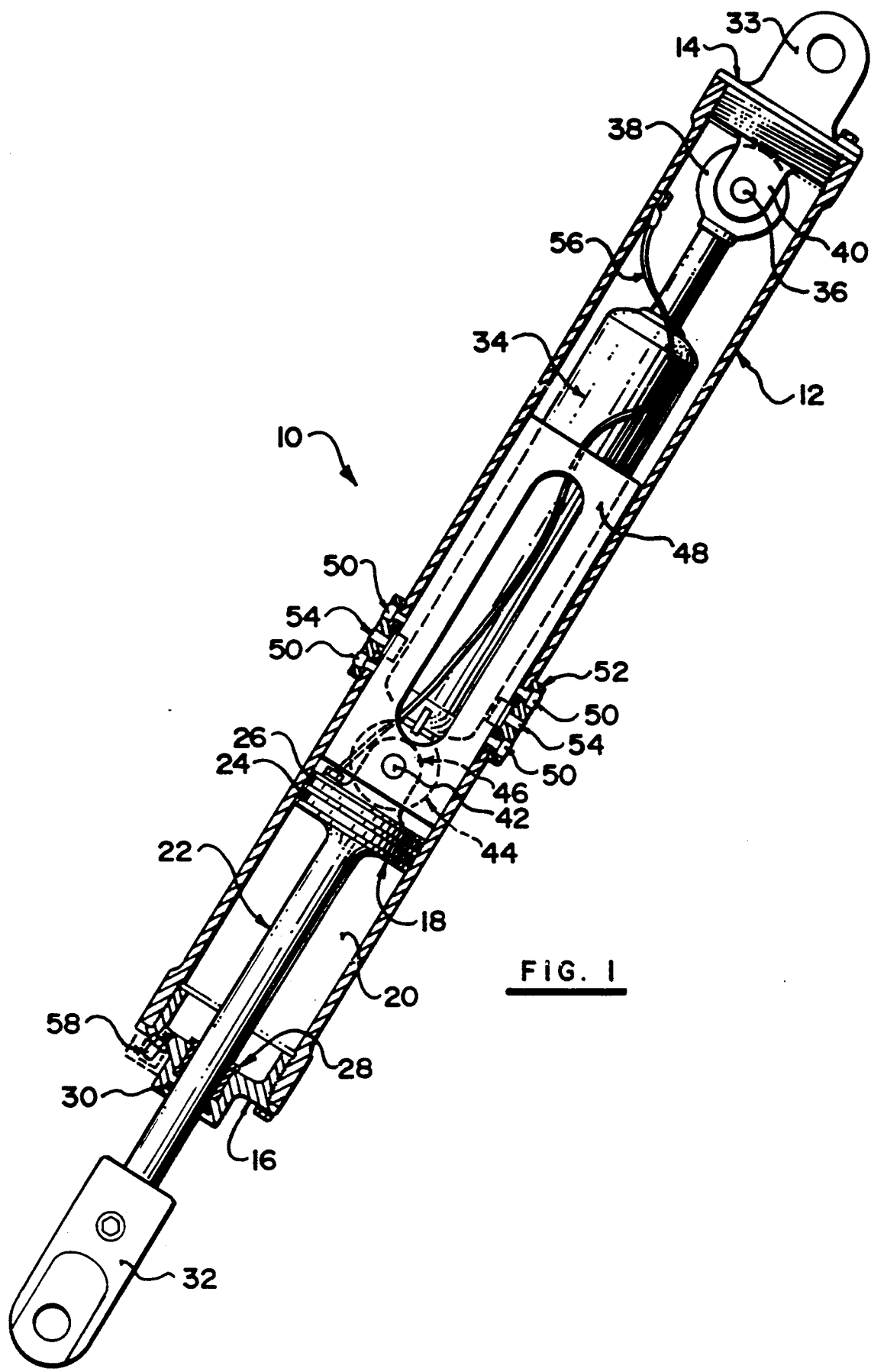
FIG. 1 is a cross-sectional illustration of a helicopter load vibration damper constructed in accordance with the preferred embodiment of the invention.

As shown in FIG. 1, helicopter load vibration damper 10 has an outer cylinder 12 with closed upper and lower ends 14, 16. Piston 18 is slidably mounted within cylinder 12 to define a gas-tight chamber 20 between piston 18 and lower cylinder end 16. One end of rod 22 is fixed to piston 18, such that rod 22 extends through chamber 20 and protrudes through lower cylinder end 16. Suitable piston seals 24 and guides 26 are provided around piston 18 to maintain chamber 20 gas-tight and to allow piston 18 to slide freely within cylinder 12. Similarly, suitable rod seals 28 and guides 30 are provided in cylinder lower end 16 around rod 22 to maintain chamber 20 gas-tight and to allow rod 22 to slide freely relative to cylinder lower end 16. A coupling device 32 is provided on the protruding end of rod 22 for attachment to a load (not shown). Another coupling device 33 is provided atop upper end 14 for attachment to a helicopter cargo line (not shown).

A power cylinder 34 is coupled between the opposite side of piston 18 and the upper end 14 of cylinder 12. In particular, pin 36 couples one of cylinder 34's mounting eyes 38 (i.e. the rod end of cylinder 34) to plate 40 which is fastened to and protrudes within cylinder upper end 14. A second pin 42 mounting eye 44 (at the non-rod or cylinder end of cylinder 34) passes through cylinder 34's other and through an aperture (not shown) in flange 46 which is fixed to piston 18, opposite the side to which rod 22 is fixed. Power cylinder 34 may be a hydraulic or pneumatic cylinder and is preferably a MONROE TM model 74001 hydraulic shock absorber.

An "anti-rotation means" is provided to prevent power cylinder 34 from rotating about its longitudinal axis, relative to rod 22. The anti-rotation means consists of tube 48 which encircles power cylinder 34, within outer cylinder 12. In addition to coupling power cylinder 34 to piston 18 as aforesaid, pin 42 also couples tube 48 to power cylinder 34 and to piston 18. Cap screws 50 fasten anti-rotation block 52 to outer cylinder 12. Anti-rotation rollers 54 reduce frictional wearing of tube 48 which would otherwise be caused by slidable displacement of tube 48 relative to outer cylinder 12.

A grounding wire 56 is electrically connected between outer cylinder 12 and piston 18, as shown to prevent possible static electric discharges within vibration damper 10. Grounding wire 56 also provides a proper electrical ground connection for cargo hooks which use a single wire electrical release system. Grounding wire 56 must be long enough to accommodate maximum extension of rod 22 when vibration damper 10 is operated as hereinafter described.

In operation, chamber 20 is pressurized with an inert gas such as nitrogen by injecting pressurized gas through valve 58. The pressure within chamber 20 is adjusted by monitoring the gas flow until the desired pressure is attained, as hereinafter explained. Vibration damper 10 is coupled to the helicopter by attaching the helicopter's cargo line (not shown) to coupling device 33. The load to be transported is coupled to coupling device 32.

Figure 2:
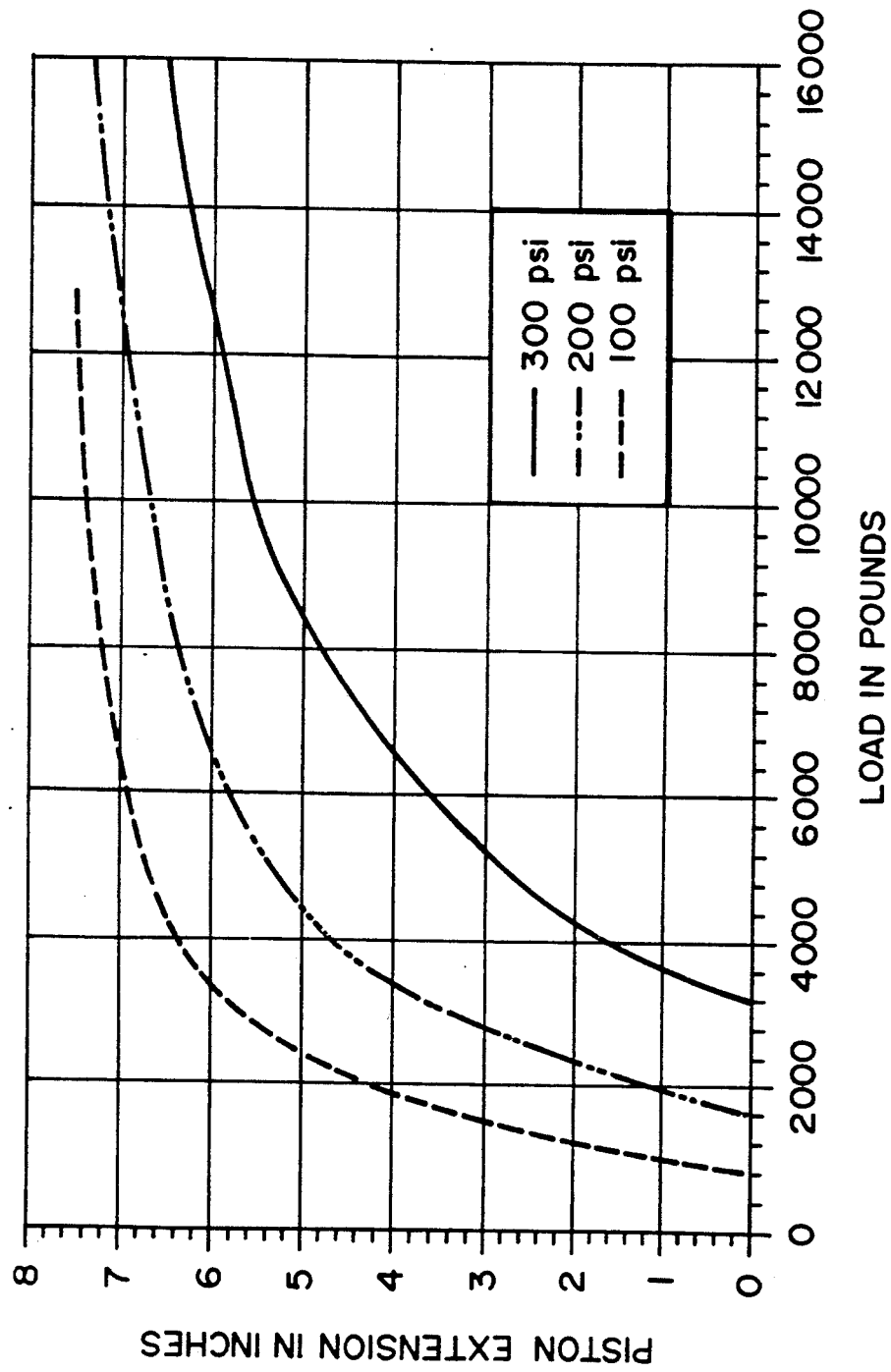
FIG. 2 is a graph which plots piston extension in inches versus load in pounds at different gas pressures for a 15,000 pound capacity helicopter load vibration damper constructed in accordance with the preferred embodiment of the invention.

The pressurized gas within chamber 20 absorbs sudden large shocks which are imposed on vibration damper 10 when the load is initially lifted, or if the load slips during transport, or inadvertently contacts the ground or some other immovable object. The pressure required to absorb such shocks varies with the weight of the load, as shown in FIG. 2. Preferably, the gas pressure within chamber 20 is adjusted so that forces imposed on vibration damper 10 by the particular load to be transported will cause piston 18 to be slidably displaced within cylinder 12 over a distance of no more than about six inches. For example, FIG. 2 shows that if a 10,000 pound load is to be carried by a 15,000 pound capacity vibration damper, then chamber 20 should be pressurized to about 260 psi in order to restrict the displacement of piston 18 to about six inches while the 10,000 pound load is transported. Power cylinder 34 damps out smaller vibrations or oscillations caused by air turbulence, manoeuvring of the helicopter, or other forces encountered as the load is transported.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A helicopter load vibration damper, comprising:
   (a) an outer cylinder having closed upper and lower ends;
   (b) a piston slidably mounted within said cylinder to define an inert gas pressurized chamber between said piston and said lower cylinder end;
   (c) a first rod fixed to one side of said piston to extend through said chamber and protrude through said lower cylinder end;
   (d) a power cylinder having a cylinder end coupled to said piston opposite said first rod and having a second rod end coupled to said upper cylinder end;
   (e) means for adjusting said chamber pressure;
   (f) anti-rotation means for preventing rotation of said power cylinder relative to said first rod about a longitudinal axis of said vibration damper, said anti-rotation means further comprising:
      (i) a tube disposed around said power cylinder, within said outer cylinder;
      (ii) coupling means for performing said coupling of said power cylinder to said piston and further for coupling said tube to said power cylinder and piston; and,
      (iii) locating means for holding said tube in place, relative to said outer cylinder.

2. A helicopter load vibration damper as defined in claim 1, wherein said power cylinder is a hydraulic shock absorber.

3. A helicopter load vibration damper as defined in claim 2, further comprising a grounding wire electrically connected between said outer cylinder and said piston to prevent electrical static discharge within said vibration damper.

4. A helicopter load vibration damper, comprising:
   (a) an outer cylinder having closed upper and lower ends;
   (b) a piston slidably mounted within said cylinder to define a gas-pressurized chamber between said piston and said lower cylinder end;
   (c) means for adjusting said chamber pressure;
   (d) a first rod fixed to one side of said piston to extend through said chamber and protrude through said lower cylinder end;
   (e) a hydraulic shock absorber having a second rod end coupled to said upper cylinder end;
   (f) a tube encircling said shock absorber within said outer cylinder;
   (g) a pin for coupling the cylinder end of said shock absorber to said piston, opposite said first rod and further for coupling said tube to said shock absorber and piston; and,
   (h) locating means for holding said tube in place, relative to said outer cylinder.

* * * * *